United States Patent [19]

de Vuyst et al.

[11] Patent Number: 4,970,402
[45] Date of Patent: Nov. 13, 1990

[54] APPARATUS FOR SENSING CHARACTERISTICS OF A TRAVELING YARN WITH YARN GUIDING MEANS

[75] Inventors: Marcel de Vuyst, Waregem, Belgium; Peter Goetsches, Monchen-Gladbach, Fed. Rep. of Germany

[73] Assignees: W. Schlafhorst & Co., Monchen-Gladbach, Fed. Rep. of Germany; Barco Automation Naamloze and Vennootschap, Poperinge, Belgium

[21] Appl. No.: 288,486

[22] Filed: Dec. 22, 1988

[30] Foreign Application Priority Data

Dec. 24, 1987 [EP] European Pat. Off. ........ 87119213.4

[51] Int. Cl.$^5$ .......................... G01V 5/00; G01N 21/00
[52] U.S. Cl. ..................................... 250/561; 356/238
[58] Field of Search ............... 356/238; 250/561, 562, 250/571, 572, 239; 57/352, 81; 66/161; 242/37 R; 139/273 A, 336; 19/0.21, 0.25

[56] References Cited

U.S. PATENT DOCUMENTS

| | | |
|---|---|---|
| 2,991,685 | 7/1961 | Van Dongeren ................... 356/238 |
| 3,158,852 | 11/1964 | Schacher ............................. 250/561 |
| 3,712,743 | 1/1973 | Harris et al. ....................... 356/238 |
| 4,311,916 | 1/1982 | Schenkel ............................ 250/561 |
| 4,341,958 | 7/1982 | Ohsawa ............................. 356/238 |
| 4,608,496 | 8/1986 | Rosen ................................. 250/561 |
| 4,691,647 | 9/1987 | von Stein .......................... 250/561 |
| 4,739,176 | 4/1988 | Allen et al. ........................ 250/572 |
| 4,743,749 | 5/1988 | Grundy ............................. 250/561 |
| 4,754,722 | 7/1988 | Rohr et al. ........................ 250/561 |
| 4,812,043 | 3/1989 | Vanstaen ........................... 356/238 |

Primary Examiner—David C. Nelms
Assistant Examiner—Michael Messinger
Attorney, Agent, or Firm—Shefte, Pinckney & Sawyer

[57] ABSTRACT

An apparatus for guiding traveling yarn through a slot in which characteristics of the yarn are sensed, includes a pair of members having surfaces engaging the traveling yarn. The surfaces of the members are spaced from the slot, in respective opposite directions, by an amount sufficient to permit circulation of a fluid therebetween for removing dust and other debris, thereby reducing the distortion of the sensing of the yarn caused by the dust and other debris. The first and second members can be integrally formed from the housing which includes the slot.

3 Claims, 1 Drawing Sheet

4,970,402

APPARATUS FOR SENSING CHARACTERISTICS OF A TRAVELING YARN WITH YARN GUIDING MEANS

BACKGROUND OF THE INVENTION

The present invention relates to an apparatus for sensing a characteristic of a segment of traveling yarn as the yarn travels through a slot of a sensing apparatus.

It is known to measure a yarn by sensing the shadow cast on a light sensitive element by the yarn or a reflection of the yarn. It is also known to measure a yarn by sensing changes in the electrical capacity of a condenser due to the presence of the yarn in an electrical field generated by the condenser. Such apparatuses are used, for example, on textile machines to monitor the production of yarn. In this respect, the accuracy of the yarn measurements can be impaired due to the presence of dust, yarn byproduct and other interfering matter.

SUMMARY OF THE INVENTION

The present invention provides an apparatus for optimally minimizing the detrimental influences of dirt and dust-like conditions occurring during yarn measuring slot operations.

Briefly described, the present invention provides, in a device for sensing characteristics of traveling yarn having a light emitting element, an element for sensing light emitted by the light emitting element and a housing including a slot, the slot being positioned between the light emitting element and the light sensing element for travel therethrough the traveling yarn, an apparatus including means for guiding the traveling yarn through the slot including a first member having a surface engaging the traveling yarn, the first surface being spaced from the slot, as measured in the direction of travel of the traveling yarn, by an amount sufficient to permit circulation of a fluid therebetween for removing dust and other debris, whereby the level of dust and other debris, which distorts sensing of light by the light sensing element, is reduced. Preferably, the apparatus includes a second member having a surface engaging the traveling yarn, the surface of the second member being spaced from the slot, as measured in the direction of travel of the traveling yarn, by an amount sufficient to permit circulation of a cleaning fluid therebetween and being spaced from the slot in the direction opposite to that of the first surface from the slot.

In one preferred embodiment of the apparatus of the present invention, the first and second members are present invention, integrally formed with the housing that includes the slot. Preferably, the first and second members are stamped from the housing.

DETAILED DESCRIPTION OF THE PREFERRED EMBODIMENT

Figure 2:
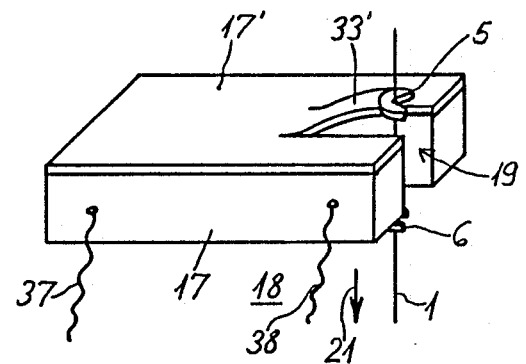
FIG. 2 is a top perspective view of a yarn guide means of a preferred embodiment of the apparatus of the present invention.
Figure 1:
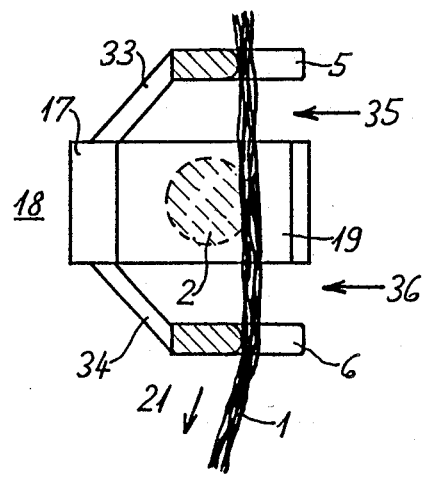
FIG. 1 is a side vertical sectional view of the yarn guiding means of one preferred embodiment of the apparatus of the present invention.

In FIGS. 1 and 2, an optoelectric device for sensing a yarn 1 includes a housing 17 defining a slot 19 and a pair of yarn guiding means 5,6 for guiding the yarn 1 during its movement in the direction indicated by the arrow 21 through the slot 19.

The housing 17 includes an assembly in the form of a chamber in which a light source 2 is mounted such that the light emitted by the light source 2 is projected transversely across the slot 19 to be received by a light sensing means also mounted in the housing 17. The light sensing means is of conventional construction and includes a pair of connectors 37,38 for connecting the light sensing means with means for sensing changes in the characteristics of the light received by the light sensing means (not shown).

The two yarn guiding means 5,6 each includes a surface engaging the yarn 1 moving thereover. Each yarn guiding means 5,6 is disposed in a position spaced from the top or bottom of the housing 17 and, specifically, the surface of each yarn guiding means 5,6 engaging the yarn 1 is spaced from the respective adjacent top or bottom surface of the housing 17, with respect to the direction of movement of the yarn 1. The yarn guiding means 5 is supported above the top surface 17' of the housing 17 by a support bracket 33. Similarly, the yarn guiding means 6 is supported from the bottom surface of the housing 17 by a support bracket 34. The spacing 35 between the yarn guiding means 5 and the top surface 17' of the housing 17 in the direction of movement of the yarn 1 has an extent in the range of about 4 to 8 millimeters. Likewise, the spacing 36 between the yarn guiding means 6 and the bottom surface of the housing 17 in the direction of movement of the yarn 1 has an extent in the range of about 4 to 8 millimeters. Advantageously, the spacings 35 and 36 permit the free circulation of air therethrough, whereby dirt, dust and other material interfering with the sensing operation can be borne away from the components involved in the sensing operation. The air circulation can be created, for example, by the movement of the yarn 1. For example, during relatively high rates of movement of the yarn 1, a circulation of air of sufficient suction force and swirling action to contribute to the removal of dirt and dust can be created. It is contemplated, however, that the cleansing air can be provided by the circulation of air in the region of the apparatus 18 or by specially adapted cleaning apparatus which are periodically or continually operated.

In FIG. 2, the illustrated embodiment of the apparatus of the present invention includes a support bracket 33' for supporting the yarn guiding means 5 on the housing 17 and a support bracket for supporting the yarn guiding means 6 on the housing 17. The support bracket 33' is integrally formed with the top surface 17' of the housing 17. Preferably, the top surface 17' is comprised of a sheet of material from which the support bracket 33' is stamped. Similarly, the support bracket of the yarn guiding means 6 can be stamped from the bottom surface of the housing 17. The free end of the support bracket 33' is split to form two branches which secure a compatibly configured plate of sintered ceramic therebetween, whereby the sintered ceramic plate serves as the yarn guiding means 5.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. In a device for sensing characteristics of a traveling yarn, the device having a light emitting element, an element for sensing light emitted by the light emitting element and a housing including a slot, the slot being positioned between the light emitting element and the light sensing element for travel therethrough of the traveling yarn, an apparatus comprising:

means for guiding the traveling yarn through the slot including a first member having a first surface for engaging the traveling yarn and a second member having a second surface for engaging the traveling yarn, said first and second surfaces being spaced from the slot in respective opposite directions relative to the direction of travel of the traveling yarn and each surface being spaced sufficiently remote from the slot to permit circulation of a fluid therebetween for removing dust and other debris and said surfaces being positioned sufficiently adjacent one another to substantially prevent lateral movement of the traveling yarn during travel of the yarn through the slot, whereby the level of dust and other debris, which distorts sensing of light by the light sensing element, is reduced.

2. In a device for sensing characteristics of a traveling yarn, an apparatus according to claim 1 and characterized further in that said first and second members are integrally formed with the housing that includes the slot.

3. In a device for sensing characteristics of a traveling yarn, an apparatus according to claim 2 and characterized further in that said first and second members are stamped from the housing.

* * * * *